(12) United States Patent
Humfeld et al.

(10) Patent No.: US 10,422,428 B2
(45) Date of Patent: Sep. 24, 2019

(54) SELF-FORMING FUEL TANK SEALANT SYSTEM

(71) Applicant: The Boeing Company, Chicago, IL (US)

(72) Inventors: Keith D. Humfeld, Federal Way, WA (US); Richard S. Badgley, Renton, WA (US)

(73) Assignee: The Boeing Company, Chicago, IL (US)

( * ) Notice: Subject to any disclaimer, the term of this patent is extended or adjusted under 35 U.S.C. 154(b) by 823 days.

(21) Appl. No.: 14/676,105

(22) Filed: Apr. 1, 2015

(65) Prior Publication Data

US 2016/0288924 A1  Oct. 6, 2016

(51) Int. Cl.
| | | |
|---|---|---|
| *B64F 5/00* | (2017.01) | |
| *F16J 15/04* | (2006.01) | |
| *B64D 37/06* | (2006.01) | |
| *B64F 5/45* | (2017.01) | |

(52) U.S. Cl.
CPC .............. *F16J 15/04* (2013.01); *B64D 37/06* (2013.01); *B64F 5/45* (2017.01)

(58) Field of Classification Search
CPC ....................................................... C09J 5/02
See application file for complete search history.

(56) References Cited

U.S. PATENT DOCUMENTS

| | | | |
|---|---|---|---|
| 4,519,974 A * | 5/1985 | Bravenec | B29C 39/10 249/117 |
| 7,358,051 B2 | 4/2008 | Gianchandani et al. | |
| 7,521,093 B2 | 4/2009 | Finerman et al. | |
| 8,808,863 B2 | 8/2014 | Russell | |
| 2005/0144874 A1 | 7/2005 | West et al. | |
| 2006/0122319 A1* | 6/2006 | Kneafsey | C08F 2/38 524/556 |

(Continued)

FOREIGN PATENT DOCUMENTS

| | | |
|---|---|---|
| EP | 2837430 | 2/2015 |
| WO | WO03/018705 | 3/2003 |

(Continued)

OTHER PUBLICATIONS

"EPO-TEK 353ND Technical Data Sheet," Epoxy Technologies, as retrieved from http://www.epotek.com/site/administrator/components/com_products/assets/files/Style_Uploads/353ND.pdf.*

(Continued)

*Primary Examiner* — Ian A Rummel
(74) *Attorney, Agent, or Firm* — Joseph M. Rolnicki; Evans & Dixon, L.L.C.

(57) ABSTRACT

A self-forming sealant system forms a seal between two parts or between a fastener and a part of a structure. In forming the seal, a first finish having a high surface energy is applied to the joint between the two parts or is applied to the fastener and the part. A second finish having a low surface energy is then applied adjacent to the area where the first finish was applied. A sealant is then applied to the joint between the two parts or the fastener and the part, where the sealant migrates to the joint or fastener coated with the first finish having the high surface energy and away from the areas adjacent the joint or the fastener coated by the second finish having the low surface energy.

20 Claims, 4 Drawing Sheets

(56) References Cited

U.S. PATENT DOCUMENTS

2010/0075151 A1* 3/2010 Weingord ............. C04B 37/008
  428/421
2013/0048081 A1 2/2013 Agrawal et al.

FOREIGN PATENT DOCUMENTS

WO 2003/076082 9/2003
WO 2013/028457 2/2013

OTHER PUBLICATIONS

European Search Report dated Sep. 15, 2016 from co-pending EP Patent Application No. 16163501.6-1757.
European Search Report dated Nov. 30, 2017 in co-pending EP Patent Application No. 17176782.5.

* cited by examiner

SELF-FORMING FUEL TANK SEALANT SYSTEM

FIELD

This disclosure pertains to a self-forming sealant system. In particular, this disclosure pertains to a self-forming seal between two parts or between a fastener and a part. In forming the seal, a first finish having a high surface energy is applied to the joint between the two parts or is applied to the fastener and the part. A second finish having a low surface energy is then applied adjacent to the area where the first finish was applied. A sealant is then applied between the joint between the two parts or the fastener and the part, where the sealant migrates to the joint or fastener coated with the first finish having the high surface energy and away from the areas adjacent the joint or the fastener coated by the second finish having the low surface energy.

BACKGROUND

In current methods of sealing a structure against liquid leaks, for example an aircraft fuel tank, ensuring liquid will not leak from the structure is a very time consuming process. A sealant must be applied over all of the joints of the structure and over all of the fasteners of the structure. This application of sealant can take considerable time.

Additionally, inspecting the sealant applied to the joints of the structure and the fasteners of the structure is also very time consuming.

In current methods of sealing joints between two parts of a structure and/or sealing a fastener in a part of a structure, a technician applies the sealant by hand. The sealant is typically in a low/sag thixotropic paste form. In a structure such as an aircraft fuel tank, the technician will apply the sealant around hundreds and potentially thousands of fasteners in the fuel tank structure by a paint brush. Additionally, applying sealant to fasteners in the structure often requires the technician to manipulate the brush in some very confined spaces. Along joints of the structure, the sealant is applied by a sealant gun similar to a caulk gun that is used to apply caulk in residential applications. The technician applies the sealant using the sealant gun and then forms the applied sealant to the joints by hand using a tool that resembles a spatula.

The technician applying sealant around the structure fasteners using a paint brush and applying sealant along the joints of the structure using the spatula are both time consuming processes. The technicians who apply sealant in aircraft applications, for example an aircraft fuel tank are typically required to work 12 hour days, seven days a week. Given the manual and repetitive nature of applying the sealant, the application of the sealant can lead to repetitive stress injuries to the technician.

Inspection of the sealant applied to the structure requires an inspector to come to the work site and inspect every sealed fastener and every inch of sealed joint on the structure. This inspection process is also time consuming, both in waiting for the inspector to be available at the work site, and for the inspector to inspect every sealed fastener and every inch of sealed joint. While the inspection is conducted, the technician waits for the inspection to be complete. Furthermore, the inspection process is prone to human error and human subjectivity.

SUMMARY

The self-forming fuel tank sealant system of this disclosure uses wetting physics to produce the final fillet shape of sealant applied to a joint between two parts and/or a fastener and a part, instead of the technician's spatula or paintbrush. In the self-forming sealant system the shape of sealant when applied to the joint or fastener is unimportant.

The sealed structure, for example the sealed aircraft fuel tank is produced by first coating a first surface area on the structure where the seal is desired with a first finish having a high surface energy. A second surface area on the structure where the seal is not needed is then coated with a second finish having a low surface energy. The surface energy of the second finish is considerably lower than the surface energy of the first finish.

A sealant is then applied to the structure where the seal is desired. The sealant is applied on the first surface area of the structure that has been coated with the first finish having the high surface energy. The physics of wetting will result in the sealant spreading out over the first surface area coated by the first finish having the high surface energy, and beading up on and flowing off of the second surface area on the structure coated with the second finish having the low surface energy.

Producing the sealed structure by the self-forming sealant system can be achieved by a spray process that efficiently applies the sealant to the areas of the structure coated with the high surface energy finish where the seal is desired. The sealant sprayed on the areas of the structure coated with the low surface energy finish where sealant is not desired will bead up and flow off of these areas. This spraying process would allow faster sealant application to joints of the structure and fasteners of the structure.

If the sealant volume applied to a joint or fastener coated with the high surface energy finish is low, the sealant meniscus will terminate on the high energy surface and the shape the sealant forms will have a contact angle of zero degrees with respect to the surface. If there is sufficient sealant, the meniscus will extend all the way to the interface between the high surface energy finish and the low surface energy finish, and will terminate at that interface with some non-zero contact angle. Thus, there is a simple test to ensure that the sealant volume applied to the joint or fastener is sufficient and the seal is correct. If there is a corner between the sealant and the surface, then there is sufficient volume of sealant and thus sufficient extent of the seal.

The features, functions and advantages that have been discussed can be achieved independently in various embodiments or may be combined in yet other embodiments, further details of which can be seen with reference to the following description and drawings.

DESCRIPTION

Figure 1:
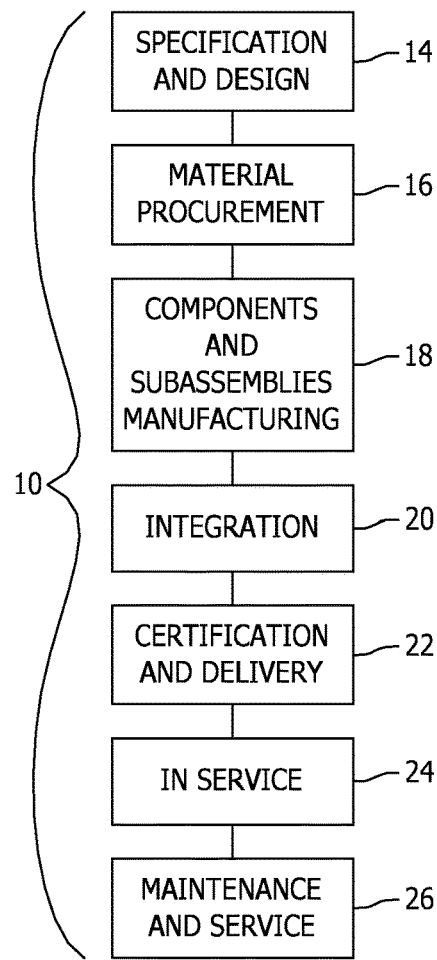
FIG. 1 is a flow diagram of aircraft production and service methodology.
Figure 2:
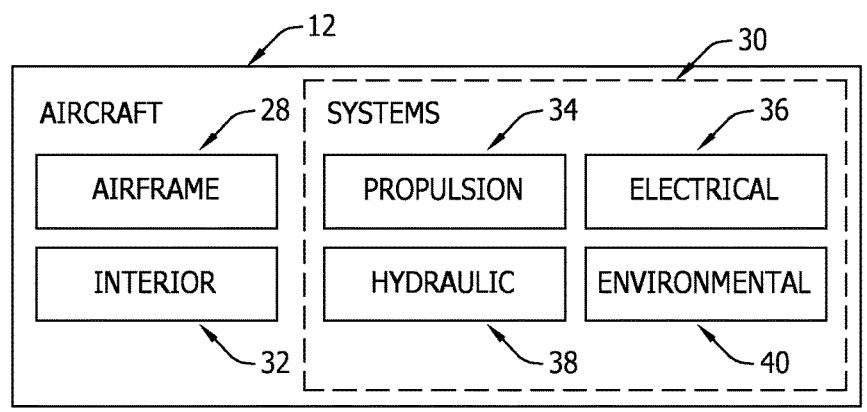
FIG. 2 is a block diagram of an aircraft.

Referring more particularly to the drawings, embodiments of the disclosure may be described in the context of an aircraft manufacturing and service method 10 as shown in FIG. 1 and an aircraft 12 as shown in FIG. 2. During pre-production, exemplary method 10 may include specification and design 14 of the aircraft 12 and material procurement 16. During production, component and subassembly manufacturing 18 and system integration 20 of the aircraft 12 takes place. Thereafter, the aircraft 12 may go through certification and delivery 22 in order to be placed in service 24. While in service by a customer, the aircraft 12 is scheduled for routine maintenance and service 26 (which may also include modification, reconfiguration, refurbishment, and so on).

Each of the processes of method 10 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 12 produced by exemplary method 10 may include an airframe 28 with a plurality of systems 30 and an interior 32. Examples of high-level systems 30 include one or more of a propulsion system 34, an electrical system 36, a hydraulic system 38, and an environmental system 40. Any number of other systems may be included. Although an aerospace example is shown (aircraft, rockets), the principles of the invention may be applied to other industries, such as the automotive, railroad or tooling industry.

Apparatus and methods embodied herein may be employed during any one or more of the stages of the production and service method 10. For example, components or subassemblies corresponding to production process 18 may be fabricated or manufactured in a manner similar to components or subassemblies produced while the aircraft 12 is in service. Also, one or more apparatus embodiments, method embodiments, or a combination thereof may be utilized during the production stages 18 and 20, for example, by substantially expediting assembly of or reducing the cost of an aircraft 12. Similarly, one or more of apparatus embodiments, method embodiments, or a combination thereof may be utilized while the aircraft 12 is in service, for example and without limitation, to maintenance and service 26.

Figure 3:
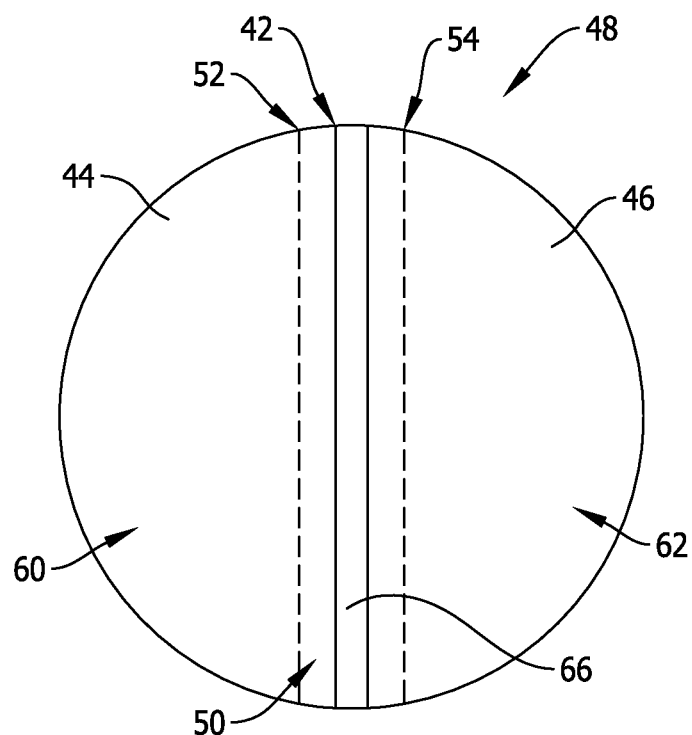
FIG. 3 is a representation of a plan view of a sealed joint along two parts or panels of a structure provided by the self-forming fuel tank sealant system of this disclosure.
Figure 4:
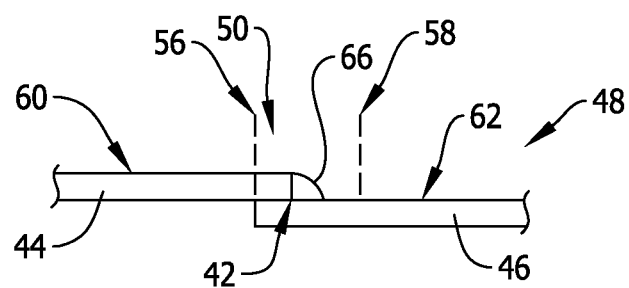
FIG. 4 is a representation of a side elevation view of the joint in FIG. 3.

FIGS. 3 and 4 show representations of the self-forming sealant system that seals a joint line 42 between two parts or panels 44, 46. The two parts 44, 46 could be parts of a liquid containing tank, for example an aircraft fuel tank, or parts of another structure in which parts of the structure connected along a joint line are required to be sealed along the joint line. The parts or panels 44, 46 could be metallic material parts such as aluminum parts, composite material parts or other equivalent types of materials. In FIGS. 3 and 4 the joint line 42 comprises the edge of one part 44 and may include a portion of the contacting surfaces of the parts 44, 46. The overlapping portions of the parts 44, 46 could be held together by welds, adhesives, fasteners or by other equivalent means.

On the sealed structure 48 represented in FIGS. 3 and 4, a first surface area 50 on the structure is represented between the dashed lines 52, 54 in FIG. 3 and the dashed lines 56, 58 in FIG. 4. The first surface area 50 is the area of the structure 48 where the seal is desired. This first surface area has a high surface energy. The high surface energy could be a characteristic of the materials of the two parts 44, 46 in the first surface area 50. Alternatively, the high surface energy could be the result of coating the first surface area 50 between the dashed lines 52, 54 in FIG. 3 and the dashed lines 56, 58 in FIG. 4 with a first finish, where the first finish has a high surface energy. Coating the first surface area 50 with the first finish also coats the joint line 42 in the first surface area with the first finish.

The structure 48 also has a second surface area 60 that is juxtaposed to the first surface area 50 but separate from the first surface area 50. In the example, the second surface area 60 on the structure 48 is to the left of the dashed line 52 shown in FIG. 3 and to the left of the dashed line 56 shown in FIG. 4. Additionally, the structure 48 has a third surface area 62 that is juxtaposed to the first surface area 50 but is separate from the first surface area 50. In the example of FIGS. 3 and 4, the third surface area 62 is just to the right of the dashed line 54 shown in FIG. 3 and to the right of the dashed line 58 shown in FIG. 4. The second surface area 60 and the third surface area 62 are on opposite sides of the first surface area 50 and have a low surface energy. The low surface energy of the second surface area 60 and the third surface area 62 could be a characteristic of the materials of the two parts 44, 46 joined on the structure 48. Alternatively, the second surface area 60 and the third surface area 62 could be coated with a second finish where the second finish has a low surface energy. The low surface energy of the second surface area and third surface area is considerably lower than the high surface energy of the first surface area. In the example of FIGS. 3 and 4, the seal is not needed on the second surface area 60 and the third surface area 62.

The sealant 66 is applied to the structure 48 on and along the joint line 42. The sealant 66 is applied on the first finish coating the first surface area 50 on the structure 48 having the high surface energy where the seal is desired. The physics of wetting will result in the sealant 66 spreading out over the first surface area 50 on the structure 48 having the high surface energy, and beading up on and flowing off of the second surface area 60 and the third surface area 62 on the structure 48 having the low surface energy.

Although only a small portion of the structure 48 and the joint line 42 on the structure is represented in FIGS. 3 and 4, it should be understood that the self-forming sealant system would be applied to all of the joint lines of the structure 48 that require a seal.

Figure 5:
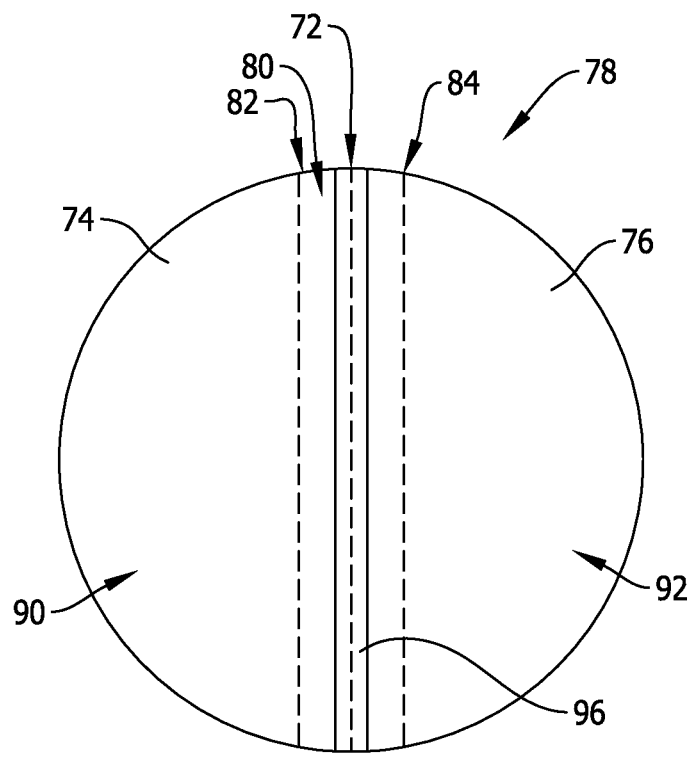
FIG. 5 is a representation of a plan view of a sealed joint between two parts or two panels of a structure provided by the self-forming fuel tank sealant system of the disclosure.
Figure 6:
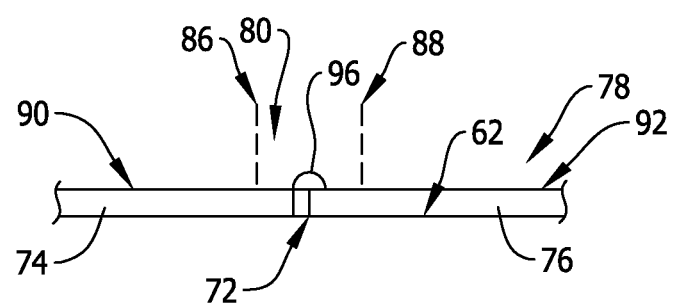
FIG. 6 is a representation of a side elevation view of the seal shown in FIG. 5.

FIGS. 5 and 6 show representations of a further application of the self-forming sealant system of this disclosure that seals a joint line 72 between two parts or panels 74, 76 of a structure 78. The two parts 74, 76 could be parts of a liquid containing tank, for example an aircraft fuel tank, or parts of another structure in which the parts of the structure connected along the joint line 72 are required to be sealed along the joint line. The parts or panels 74, 76 could be metal parts such as aluminum parts, composite parts or other equivalent types of materials. In FIGS. 5 and 6 the joint line 72 is formed between two abutting edges of the parts 74, 76. The abutting edges of the parts 74, 76 could be held together by welds, by adhesives, by fasteners or by other equivalent means.

On the sealed structure 78 represented in FIGS. 5 and 6, a first surface area 80 on the structure 78 is represented between the dashed lines 82, 84 in FIG. 5 and between the dashed lines 86, 88 in FIG. 6. This first surface area 80 is the area of the structure 78 where the seal is desired. The first surface area 80 has a high surface energy. The high surface energy could be a characteristic of the materials of the two parts 74, 76 in the first surface area 80. Alternatively, the high surface energy could be the result of a first finish coating the first surface area 80 between the dashed lines 82, 84 in FIG. 3 and the dashed lines 86, 88 in FIG. 4, where the first finish has a high surface energy.

The structure 78 also has a second surface area 90 that is juxtaposed to the first surface area 80 but separate from the first surface area 80. In the example of FIGS. 5 and 6, the second surface area 90 on the structure 78 is to the left of the dashed line 82 shown in FIG. 5 and to the left of the dashed line 86 shown in FIG. 6. Additionally, the structure 78 has a third surface area 92 that is juxtaposed to the first surface area 80 but is separate from the first surface area 80. In the example of FIGS. 5 and 6, the third surface area 92 is just to the right of the dashed line 84 shown in FIG. 5 and to the right of the dashed line 88 shown in FIG. 6. The second surface area 90 and the third surface area 92 have a low surface energy. The low surface energy of the second surface area 90 and the third surface area 92 could be a characteristic of the materials of the two parts 74, 76 joined on the structure 78. Alternatively, the second surface area 90 and the third surface area 92 could be coated with a second finish where the second finish has a low surface energy. The low surface energy of the second surface area and third surface area is considerably lower than the high surface energy of the first surface area. In the example of FIGS. 5 and 6, the seal is not needed on the second surface area 90 and the third surface area 92.

The sealant 96 is applied to the structure 78 along the joint line 72. The sealant 96 is applied on the first surface area 80 on the structure 78 having the high surface energy where the seal is desired. The physics of wetting will result in the sealant 96 spreading out over the first surface area 80 on the structure 78 having the high surface energy, and beading up on and flowing off of the second surface area 90 and the third surface area 92 on the structure 78 having a low surface energy.

Although only a small portion of the structure 78 and the joint line 72 on the structure is represented in FIGS. 5 and 6, it should be understood that the self-forming sealant system would be applied to all of the joint lines of the structure 78 that require a seal.

Figure 7:
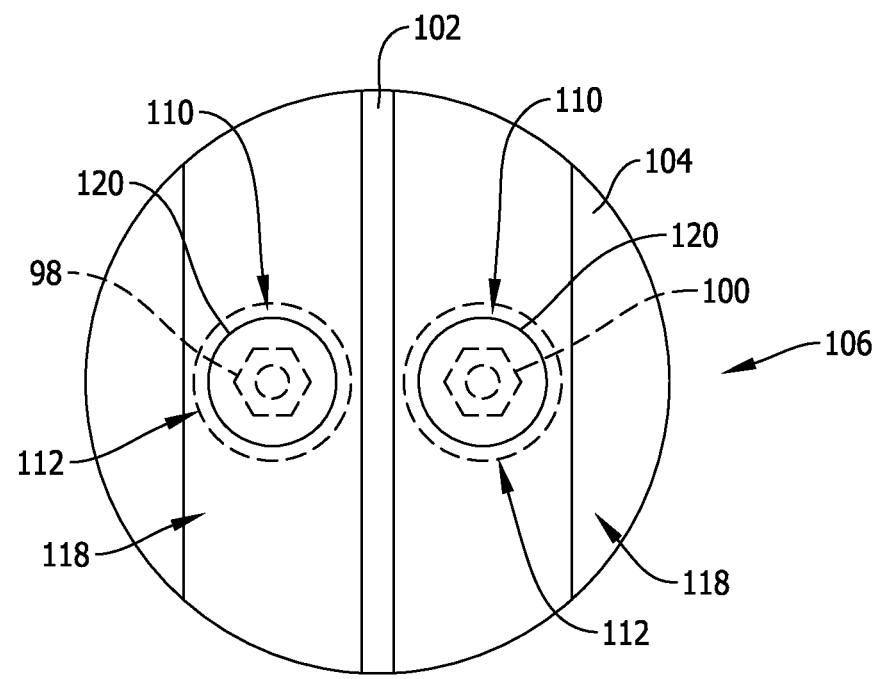
FIG. 7 is a representation of a plan view of seals on fasteners in parts or panels of a structure provided by the self-forming fuel tank sealant system of this disclosure.
Figure 8:
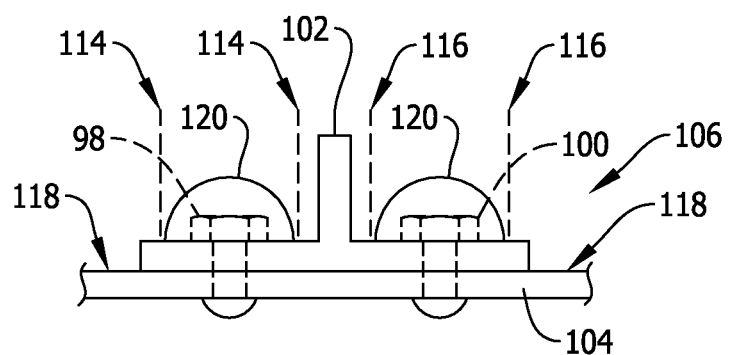
FIG. 8 is a representation of a side elevation view of the seals shown in FIG. 7.

FIGS. 7 and 8 show representations of the self-forming sealant system that seals fasteners 98, 100 that attach two parts 102, 104 of a structure 106 together. Again, the two parts 102, 104 could be parts of a liquid containing tank, for example an aircraft fuel tank, or parts of another structure in which parts of the structure connected by fasteners are required to be sealed at the fastener connections. The parts 102, 104 could be metal parts such as aluminum parts, composite parts or equivalent types of materials. The fasteners 98, 100 are typically metal parts.

On the sealed structure 106 represented in FIGS. 7 and 8, first surface areas 110 on the structure are represented by the dashed lines 112 in FIG. 7 and the dashed lines 114, 116 in FIG. 8. The first surface areas 110 are the areas of the structure 106 where the seals are desired. The first surface areas 110 have a high surface energy. The fasteners 98, 100 also have a high surface energy. The high surface energy could be a characteristic of the materials of the part 102 in the first surface areas 110 and a characteristic of the materials of the fasteners 98, 100. Alternatively, the high surface energy could be a result of a first finish coating the first surface areas 110 and the fasteners 98, 100 within the dashed lines 112 of FIG. 7 and within the dashed lines 114, 116 of FIG. 8, where the first finish has a high surface energy. Coating the first surface areas 110 with the first finish also coats the fasteners 98, 100 with the first finish.

The structure 106 also has a second surface area 118 that is juxtaposed to the first surface areas 110 but is separate from the first surface areas 110 and outside of the first surface areas 110. In the example of FIGS. 7 and 8, the second surface area 118 on the structure 106 is outside of and surrounds the dashed lines 112 shown in FIG. 7. The second surface area 118 has a low surface energy. The low surface energy of the second surface area 118 could be a characteristic of the materials of the part 102 outside of the dashed lines 112. Alternatively, the second surface area 118 could be coated with a second finish where the second finish has a low surface energy. The low surface energy of the second finish is considerably lower than the high surface energy of the first finish. In the example of FIGS. 7 and 8, the seal is not needed on the second surface area 118.

The sealant 120 is applied to the first part 102 of the structure 106 and on the fasteners 98, 100. The sealant 120 is applied on the first surface areas 110 on the structure 106 having the high surface energy where the seal is desired. The physics of wetting will result in the sealant 120 spreading out over the first surface areas 110 on the structure 106 having the high surface energy, and beading up and flowing off of the second surface area 118 having the low surface energy.

Although only two fasteners 98, 100 of the structure 106 are represented in FIGS. 7 and 8, it should be understood that the self-forming sealant system would be applied to all of the fasteners of the structure 106 that require a seal.

In each of the examples of the self-forming sealant system discussed above, the sealant can be applied by a spray process that efficiently applies a sealant to the areas of the structure coated with the high surface energy finish where the seal is desired. The sealant sprayed on the areas of the structure coated with the low surface energy finish where the sealant is not desired will bead up and flow off of these areas. This spraying process will allow faster sealant application to joints of the structure and fasteners of the structure.

If the sealant volume applied to a joint or fastener coated with the high surface energy finish is low, the sealant meniscus will terminate on the high energy surface and the shape the sealant forms will have a contact angle of zero degrees with respect to the surface. If there is sufficient sealant, the meniscus will extend all the way to the interface between the high surface energy finish and the low surface energy finish, and will terminate at that interface with some non-zero contact angle. Thus, there is a simple test to ensure that the sealant volume applied to the joint or fastener is sufficient and the seal is correct. If there is a corner between the sealant and the surface, then there is sufficient volume of sealant and thus sufficient extent of the seal.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A sealed structure comprising:
a first part of the structure;
a second part of the structure;
the first part of the structure and the second part of the structure are connected and are held together;
a first surface area on the structure, the first surface area having a high surface energy;
the first part of the structure and the second part of the structure are connected and are held together in the first surface area on the structure;
a second surface area on the structure, the second surface area having a low surface energy, the low surface energy being less than the high surface energy; and,
a sealant on the first surface area on the structure, the sealant being substantially absent from the second surface area on the structure, and the sealant having an exposed fillet shaped meniscus surface between the first surface area and the second surface area on the structure.

2. The sealed structure of claim 1, further comprising:
the first surface area on the structure and the second surface area on the structure being juxtaposed.

3. The sealed structure of claim 1, further comprising:
the second surface area on the structure surrounding the first surface area on the structure.

4. The sealed structure of claim 1, further comprising:
a third surface area on the structure, the third surface area having the low surface energy; and,
the second surface area on the structure and the third surface area on the structure being on opposite sides of the first surface area on the structure.

5. The sealed structure of claim 4, further comprising:
the second surface area on the structure and the third surface area on the structure being juxtaposed to the first surface area on the structure.

6. The sealed structure of claim 1, further comprising:
a joint line between the first part of the structure and the second part of the structure;
the joint line being in the first surface area on the structure; and,
the sealant is on the first surface area on the structure on and along the joint line.

7. The sealed structure of claim 1, further comprising:
a fastener on the first surface area on the structure;
the fastener having a fastener surface that is part of the first surface area on the structure; and,
the sealant being on the fastener.

8. A sealed structure comprising:
a first part of the structure;
a second part of the structure;
the first part of the structure and the second part of the structure are connected and are held together;
a first surface area on the structure;
the first part of the structure and the second part of the structure are connected and are held together in the first surface area on the structure;
a first finish coating the first surface area on the structure, the first finish having a high surface energy;
a second surface area on the structure;
a second finish coating the second surface area on the structure, the second finish having a low surface energy, the low surface energy being less than the high surface energy; and,
a sealant on the first finish, the sealant being substantially absent from the second finish, and the sealant having an exposed fillet shaped meniscus surface between the first finish and the second finish.

9. The sealed structure of claim 8, further comprising:
the first finish and the second finish being juxtaposed.

10. The sealed structure of claim 8, further comprising:
the second finish surrounding the first finish.

11. The sealed structure of claim 8, further comprising:
a third surface area on the structure;
the second finish coating the third surface area on the structure; and,
the second surface area on the structure and the third surface area on the structure being on opposite sides of the first surface area on the structure.

12. The sealed structure of claim 11, further comprising:
the second surface area on the structure and the third surface area on the structure being juxtaposed to the first surface area on the structure.

13. The sealed structure of claim 8, further comprising:
the first part of the structure and the second part of the structure being joined together along a joint line;
the joint line being in the first surface area on the structure;
the first finish coating the joint line; and,
the sealant is on the first finish on and along the joint line.

14. The sealed structure of claim 8, further comprising:
a fastener on the first surface area on the structure; and,
the first finish coating the fastener.

15. The sealed structure of claim 8, further comprising:
the sealed structure being constructed of composite materials.

16. The sealed structure of claim 8, further comprising;
the sealed structure being constructed of metallic materials.

17. A method of sealing a structure comprising:
connecting a first part of the structure and a second part of the structure together and holding the first part of the structure and the second part of the structure together;
coating a first surface area on the structure with a first finish, the first part of the structure and the second part of the structure that are connected together and held together being in the first surface area on the structure, the first finish having a high surface energy;
coating a second surface area on the structure with a second finish, the second finish having a low surface energy that is less than the high surface energy; and,
applying a sealant on the first finish coating the first surface area on the structure, the sealant being substantially absent from the second finish coating the second surface area on the structure, and the sealant having an exposed fillet shaped meniscus surface between the first finish and the second finish.

18. The method of claim 17, further comprising:
coating the first surface area on the structure with the first finish juxtaposed to the second finish coating the second surface area on the structure.

19. The method of claim 17, further comprising:
coating a joint line between the first part of the structure and the second part of the structure connected together and held together in the first surface area on the structure with the first finish.

20. The method of claim 17, further comprising:
coating a fastener in the first surface area on the structure with the first finish.

* * * * *